(12) United States Patent
James et al.

(10) Patent No.: US 12,535,140 B2
(45) Date of Patent: Jan. 27, 2026

(54) REPLACEABLE SEAT FOR CONVERTIBLE CHECK VALVE

(71) Applicant: Cornell Pump Company LLC, Clackamas, OR (US)

(72) Inventors: Seth James, Colton, OR (US); Jordan Russell White, Canby, OR (US)

(73) Assignee: Cornell Pump Company LLC, Clackamas, OR (US)

( * ) Notice: Subject to any disclaimer, the term of this patent is extended or adjusted under 35 U.S.C. 154(b) by 0 days.

(21) Appl. No.: 18/652,097

(22) Filed: May 1, 2024

(65) Prior Publication Data

US 2024/0384797 A1     Nov. 21, 2024

Related U.S. Application Data

(60) Provisional application No. 63/502,695, filed on May 17, 2023.

(51) Int. Cl.
    *F16K 1/20*          (2006.01)
    *F16K 1/42*          (2006.01)
                  (Continued)

(52) U.S. Cl.
    CPC .............. *F16K 1/2057* (2013.01); *F16K 1/42* (2013.01); *F16K 15/03* (2013.01); *F16K 25/005* (2013.01)

(58) Field of Classification Search
    CPC ........ F16K 1/2057; F16K 1/42; F16K 1/2263; F16K 1/2265; F16K 15/03; F16K 15/031;
(Continued)

(56) References Cited

U.S. PATENT DOCUMENTS

| 1,947,257 A | 2/1934 | Fritz et al. |
|---|---|---|
| 3,394,731 A | 7/1968 | Elliott |

(Continued)

FOREIGN PATENT DOCUMENTS

| DE | 1968396 U | 9/1967 |
|---|---|---|
| DE | 3720822 A1 | 1/1989 |
| EP | 0899489 A1 | 3/1999 |

OTHER PUBLICATIONS

International Search Report and Written Opinion issued in corresponding International Application No. PCT/US2024/027167, mailed on Aug. 14, 2024, 17 pages.

*Primary Examiner* — Patrick C Williams
(74) *Attorney, Agent, or Firm* — Fish & Richardson P.C.

(57) ABSTRACT

A replaceable seat is provided for a convertible check valve. The convertible check valve includes a first valve body section having a first passageway and a first flange, and a second valve body section having a second passageway and a second flange. The second flange is configured for connection to the first flange. The check valve also includes a flapper that moves between a closed state and an opened state. The flapper prevents flow between the first passageway and the second passageway when the flapper is in the closed state. The check valve also includes a gasket interposed between the first flange and the second flange. The gasket includes an opening to permit fluid communication between the first passageway and the second passageway and a valve seat with an integrated O-ring that is configured to contact the flapper when the flapper is in the closed state.

20 Claims, 12 Drawing Sheets

Section A-A (51) Int. Cl.
  *F16K 15/03*   (2006.01)
  *F16K 25/00*   (2006.01)

(58) Field of Classification Search
  CPC ............. F16K 27/0281; F16K 27/0227; F16K 25/005; F16J 15/0825; F16J 15/122
  See application file for complete search history.

(56) References Cited

U.S. PATENT DOCUMENTS

| | | | |
|---|---|---|---|
| 4,261,383 A | 4/1981 | Prince | |
| 4,508,139 A | 4/1985 | Teumer | |
| 4,660,599 A * | 4/1987 | Fast | F16K 17/12 |
| | | | 137/527.6 |
| 4,872,480 A | 10/1989 | Scaramucci | |
| 5,076,308 A * | 12/1991 | Cohen | F16K 37/0016 |
| | | | 74/553 |
| 5,117,871 A | 6/1992 | Gardner et al. | |
| 5,261,449 A | 11/1993 | Smetters | |
| 5,284,178 A * | 2/1994 | Lardieri | F16K 27/0218 |
| | | | 251/102 |
| 5,368,069 A | 11/1994 | Felber | |
| 9,068,661 B2 | 6/2015 | Dyer et al. | |
| 9,212,756 B2 * | 12/2015 | Kamp | F16K 27/0227 |
| 10,107,405 B2 | 10/2018 | Huang et al. | |
| 10,190,695 B2 | 1/2019 | Grompe et al. | |
| 10,890,265 B2 | 1/2021 | Fink | |
| 11,512,781 B2 | 11/2022 | Witkowski | |
| 2005/0139266 A1 | 6/2005 | Partridge | |
| 2008/0308159 A1 | 12/2008 | Stunkard | |
| 2010/0143076 A1 | 6/2010 | Matsumoto et al. | |
| 2011/0061751 A1 | 3/2011 | Jumpol | |
| 2013/0327974 A1 | 12/2013 | Dyer et al. | |
| 2015/0260317 A1 * | 9/2015 | Yamamoto | F16J 15/104 |
| | | | 277/609 |
| 2016/0053904 A1 | 2/2016 | Huang et al. | |
| 2017/0059052 A1 * | 3/2017 | Abouelleil | F16K 1/2266 |
| 2019/0293193 A1 | 9/2019 | Fink | |
| 2022/0018446 A1 | 1/2022 | Witkowski | |

* cited by examiner

REPLACEABLE SEAT FOR CONVERTIBLE CHECK VALVE

CROSS-REFERENCE TO RELATED APPLICATION

This application claims priority to under 35 U.S.C. § 119, based on U.S. Provisional Patent Application No. 63/502,695 filed May 17, 2023, titled "Replaceable Seat for Convertible Check Valve," the disclosure of which is hereby incorporated by reference.

BACKGROUND OF THE INVENTION

Check valves are commonly used in water and wastewater systems to prevent reverse flow in such systems. Typically, these valves include a resilient disk or flapper which is mounted between the inlet section of the valve and the outlet section of the valve. Some check valves may incorporate inlet and outlet sections which are axially aligned (a "straight" configuration) and some may have sections that extend perpendicularly to each other (an "elbow" configuration). A convertible check valve has been developed so that a single valve assembly may be oriented in either a straight configuration or an elbow configuration.

Irrespective of whether a convertible valve is in a straight configuration or an elbow configuration, the resilient disk or flapper is typically pivoted or flexed to an open position by the flow of liquid into the inlet section of the valve, whereupon the liquid can flow to the outlet section. In the event that the pressure within the check valve exceeds a predetermined level, e.g., an over-pressure in the outlet section exist, the resilient disk or flapper flexes or pivots downward into engagement with the valve seat to isolate the inlet section from the outlet section.

Deterioration of the flapper/seat seal is a potential failure point and typically requires replacement of the entire check valve. A need exists for a check valve with a replaceable valve seat, so that service life of the check valve can be extended.

DETAILED DESCRIPTION

The disclosed invention relates to check valves, and more particularly to flapper-based check valves that are convertible or configurable so that the inlet and outlet can be axially aligned or can extend perpendicularly to each other, e.g., be of an elbow configuration.

According to implementations described herein, a convertible check valve includes a face gasket with an O-ring built into the face. When the face gasket is installed between adjoining check valve body sections, the O-ring is positioned around the flow orifice and located outside the flow path of the check valve. Including the O-ring with the face gasket on the sealing face of the check valve allows the face to be replaceable in the event of wear. According to an implementation, the face gasket includes a compressible material that is molded over a thin metal insert (or support disk) for added rigidity.

In typical valves, the face is simply a cast surface that is integral with the check valve body. With this typical configuration, an O-ring to seal around the flow orifice is included on the moveable flapper, which places the O-ring in the flow path and subjects the O-ring to more rapid wear. Implementations described herein may use a flapper with a flat underside surface that engages the O-ring on the face gasket.

Figure 1:
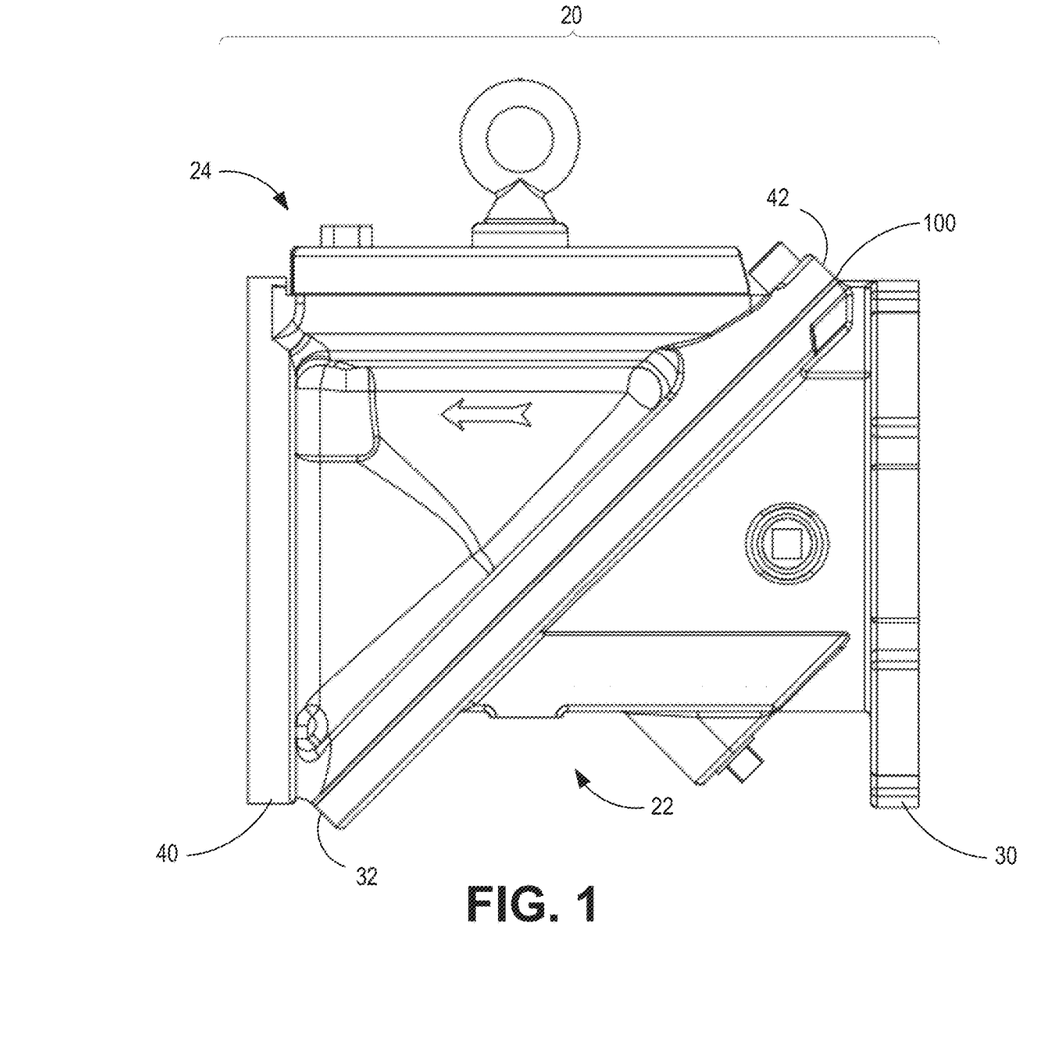
FIG. 1 is a side view of an exemplary embodiment of a convertible check valve, according to an implementation.

Referring now to the drawings wherein like characters refer to like parts, there is shown at 20 in FIG. 1 an exemplary embodiment of a convertible check valve constructed in accordance with this invention. The convertible check valve 20 is suitable for use in any liquid carrying application requiring the ability to prevent backflow (e.g., water and wastewater treatment systems) and wherein the valve can be connected between an inlet pipe and an outlet pipe (not shown) that are either axially aligned or extend perpendicularly to each other. The check valve 20, as described below, is one example of various convertible check valves that can be constructed in accordance with this invention. Thus, as can be seen, the convertible check valve 20 comprises a first valve body section 22 and a second valve body section 24 that are joined at a face gasket 100.

The first valve body section 22 (also referred to as an "inlet section") is best seen in FIGS. 1, 2B, 3B, 4A, 5A, and 5B and includes an outer end in the form of a peripheral flange 30, an inner end in the form of a peripheral flange 32, and a central passageway 34 extending fully through the body section 22 between the flanges 30 and 32. The passageway 34 serves as the inlet passageway for the check valve 20 and has a central longitudinal axis 34A. The flange 32 includes a planar inner end surface 36 (FIGS. 4B, 4C) that extends at an angle of forty-five degrees to the central longitudinal axis 34A. The outer flange 30 includes a planar end surface 38 that extends at an angle of ninety degrees to the central longitudinal axis 34A. The outer flange 30 is arranged to be releasably secured to a flanged input pipe (not shown), via associated threaded fasteners, such as hex bolts or screws.

The second valve body section 24 (also referred to as an "outlet section") is best seen in FIGS. 1, 2A, 2B, 3A, 3B, 4B, and 4C and includes an outer end in the form of a peripheral flange 40, an inner end in the form of a peripheral flange 42, and a central passageway 44 extending fully through the body section 24 between the flanges 40 and 42. The passageway 44 serves as the outlet passageway for the convertible check valve 20 and has a central longitudinal axis 44A. The flange 42 includes a planar inner end surface that extends at an angle of forty-five degrees to the central longitudinal axis 44A. The outer flange 40 includes a planar end surface 48 that extends at an angle of ninety degrees to the central longitudinal axis 44A. The outer flange 40 is arranged to be releasably secured to a flanged outlet pipe (not shown) via associated threaded fasteners.

Figure 2A:
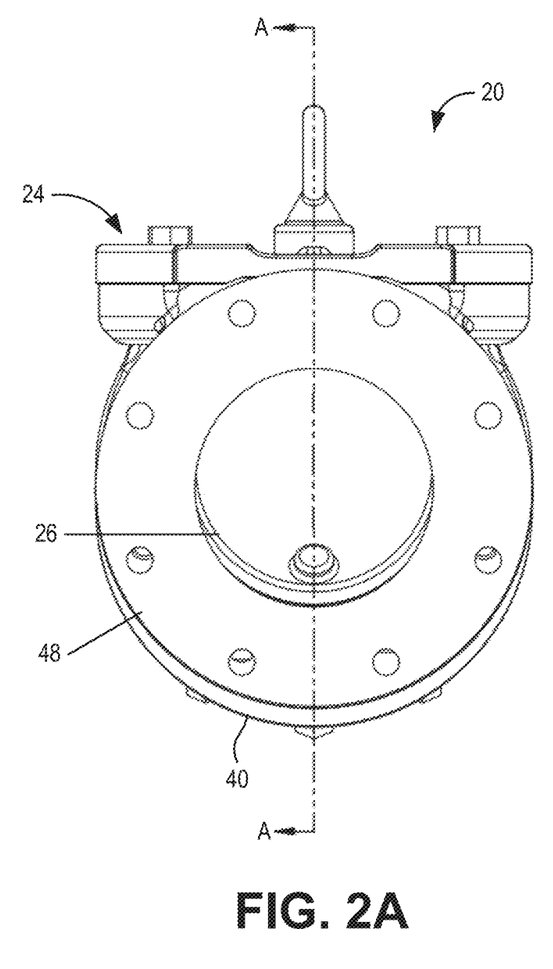
FIGS. 2A and 2B are front and side cross-section views of the convertible check valve of FIG. 1, shown in a straight configuration.
Figure 2B:
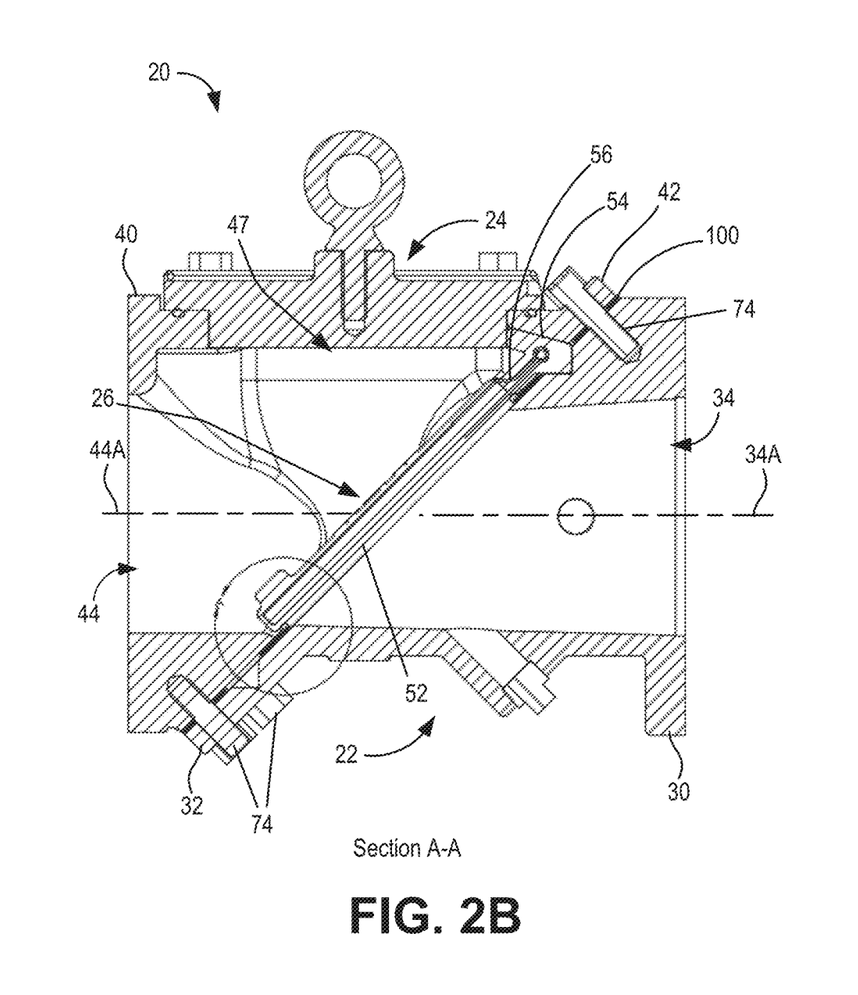
Figure 3A:
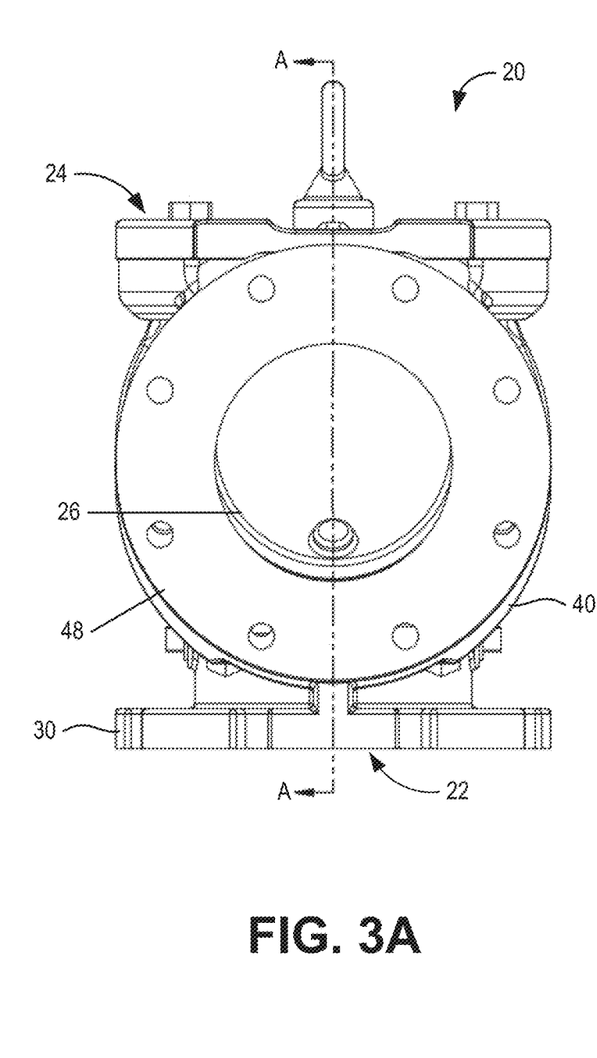
FIGS. 3A and 3B are front and side cross-section views of the convertible check valve of FIG. 1, shown in an elbow configuration.
Figure 3B:
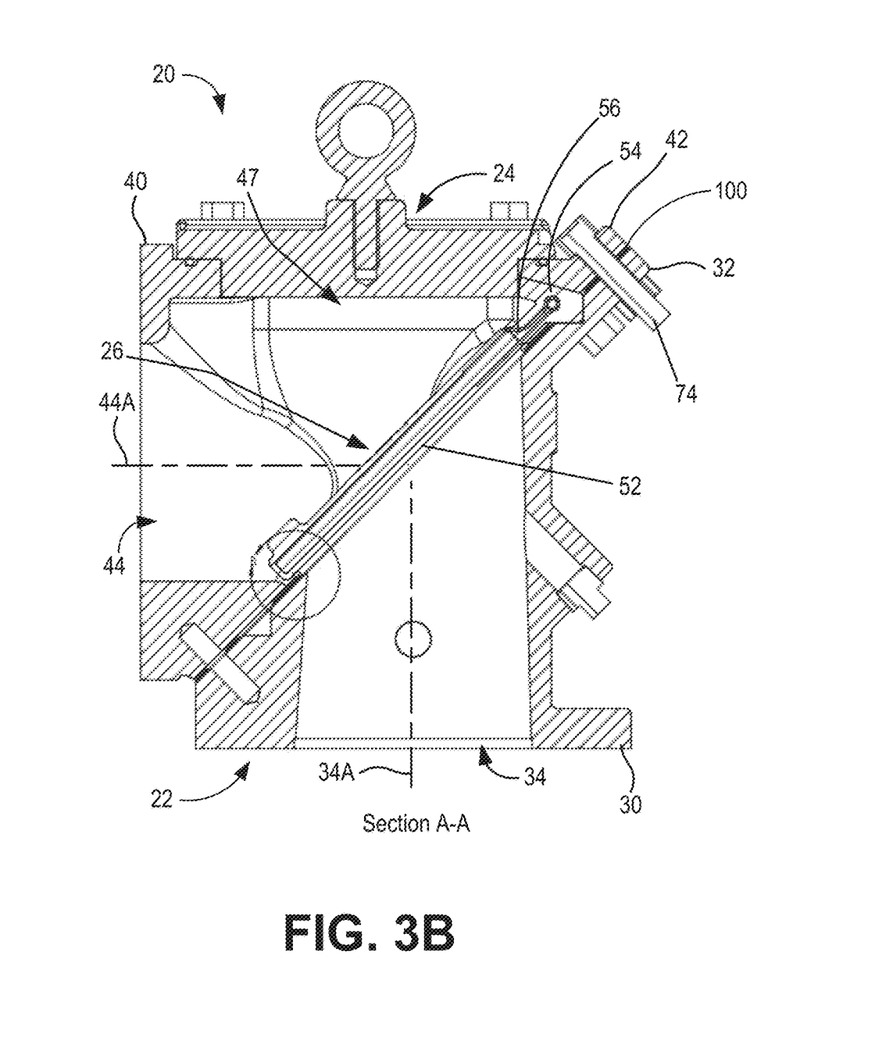

The body sections 22 and 24 are configured to be releasably secured to each other in either one of two configurations or states, namely, an axially aligned (or straight) configuration, best seen in FIGS. 1 and 2B, and an angled configuration, best seen in FIGS. 3A and 3B. In the straight configuration the central axes 34A and 44A of the passageways 34 and 44, respectively, are generally axially aligned, i.e., are coaxial. In the angled configuration the central axes 34A and 44A of the passageways 34 and 44, respectively, are perpendicular to each other, whereupon the valve 20 is configured as an elbow valve.

The open inner end of the passageway 34 at flange 32 forms an outlet flow port for the valve body section 22. Since the inner surface 36 (FIGS. 4B, 4C) of flange 32 extends at an angle of 45 degrees to the central longitudinal axis 34A, the outlet flow port is elliptical in shape. The outlet flow port of the first body section 22 is arranged to be coupled to an inlet flow port of the valve body section 24 at an interface that enables maximum flow of fluids between the valve body sections 22 and 24, irrespective of whether those sections are in the aligned orientation or elbow orientation. To that end, the open inner end of the outlet passageway 44 at the angled inner surface of the valve body section 24 forms an outlet flow port for the valve body section 24. Since the inner surface 46 (FIG. 4C) of flange 42 extends at an angle of 45 degrees to the central longitudinal axis 44A, the outlet flow port of the valve body section 24 is elliptical in shape and similar in size and profile to the inlet flow port of the valve body section 22. The perimeter at the inlet of passageway 44 is slightly larger than the perimeter at the outlet of passageway 34, thus creating space for a valve seat around outlet flow port of the first body section 22.

Figure 2C:
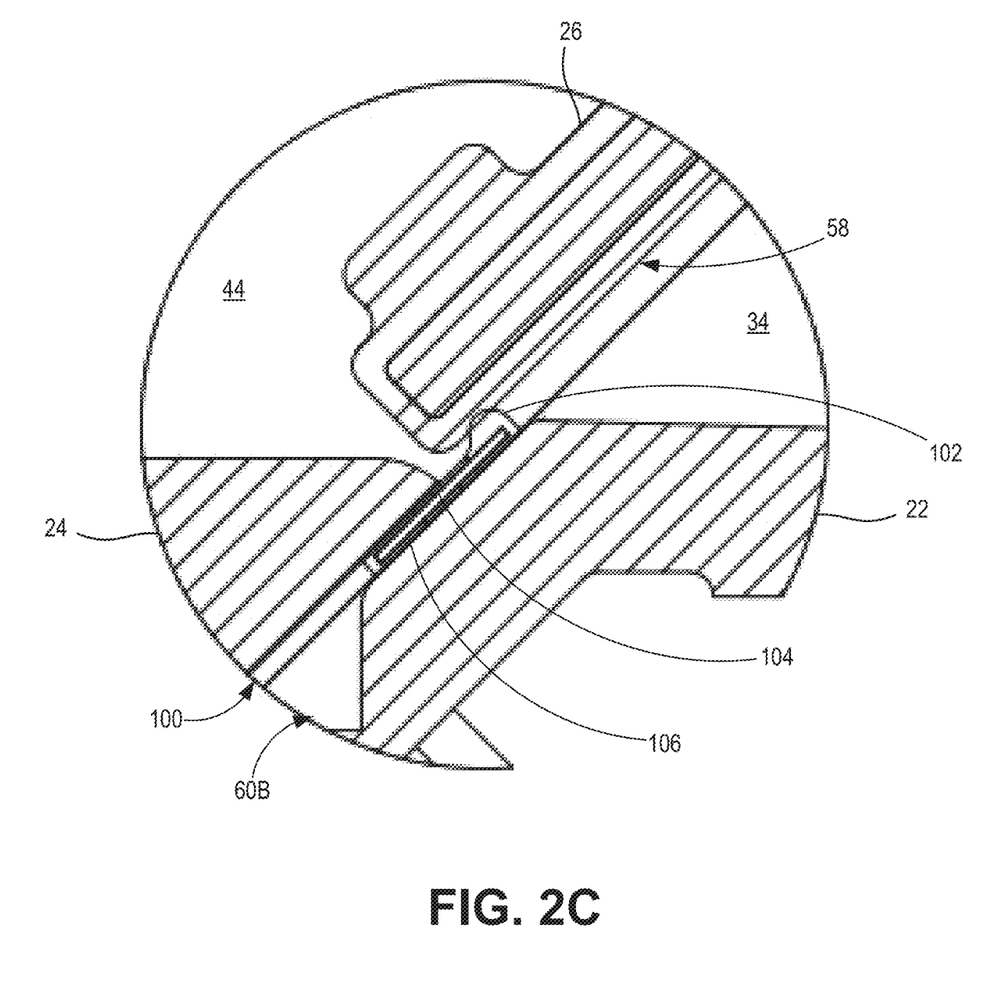
FIG. 2C is an enlarged view of a portion of FIG. 2B.
Figure 3C:
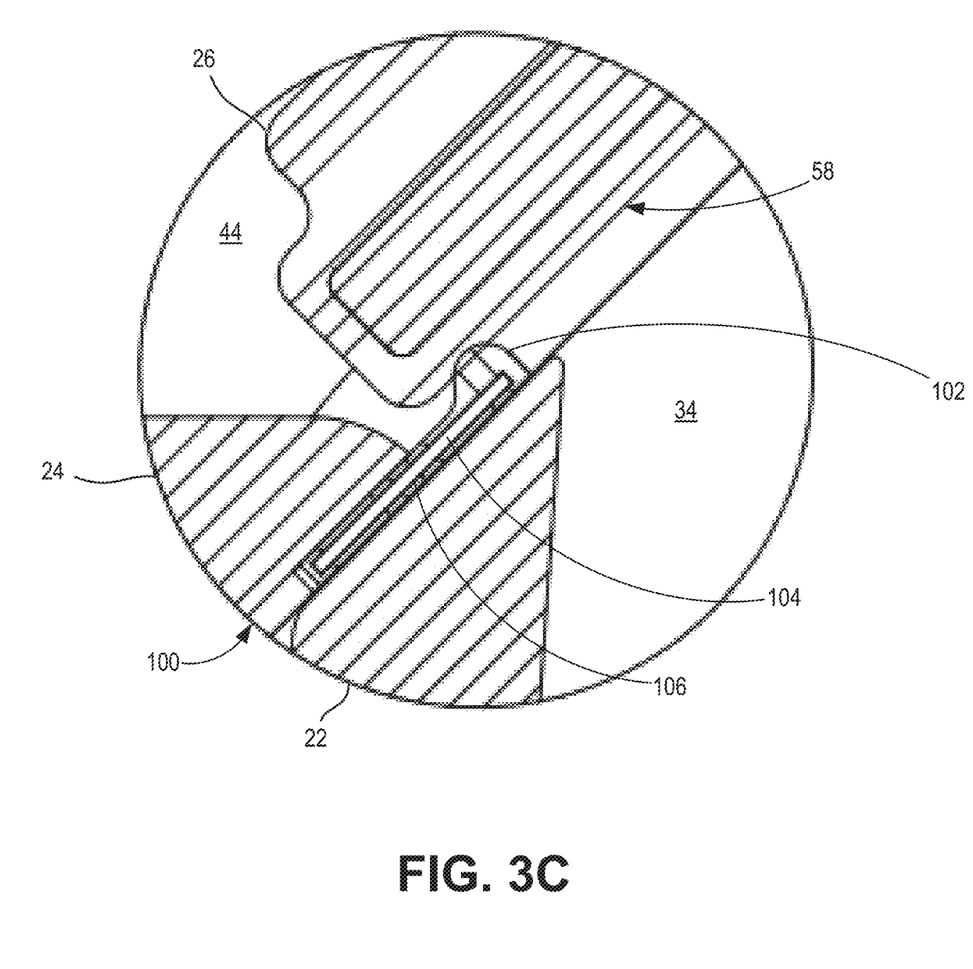
FIG. 3C is an enlarged view of a portion of FIG. 3B.

Convertible check valve 20 also includes a flapper valve member 26. The flapper valve member 26 (also sometimes referred to hereinafter as the "flapper") is mounted within and between the valve body sections 22 and 24 irrespective of their orientation. The flapper 26 is a unitary body that may be formed of a resilient and flexible material (e.g., rubber), a rigid material, or a combination of materials. In examples shown and described herein, flapper 26 includes a main section 52 and a mounting section 54. The main section 52 is of an elliptical peripheral shape. As best shown in FIGS. 2C and 3C, a contact surface 58 of the main section 52 of the flapper 26 is planar. The resilient material making up the flapper 26 preferably includes internal reinforcement, e.g., a nylon strip 56, located at the interface between the main section 52 and the mounting section 54 and which is embedded in the rubber making up the flapper. It is at this interface that the flapper valve member will pivot or flex when the check valve 20 is in operation. The reinforcement ensures that the main section 52 of the flapper 26 will not tear off in high flow rates.

The manner in which the valve body sections 22 and 24 of the convertible check valve 20 are configured and the manner in which the flapper 26 is mounted between and within those sections enables those sections to be releasably connected in either the straight configuration or the elbow configuration. In either the straight configuration or the elbow configuration, flange 32 of valve body section 22 and flange 42 of valve body section 24 are mated with face gasket 100 secured therebetween.

As shown in FIGS. 2B and 3B, a recess 47 is located in the body section 24 at the top of the passageway 44. Recess 47 may have a depth approximately equal to the thickness of main section 52 of flapper valve member 26. Recess 47 may form an elliptically-shaped planar surface, extending parallel to longitudinal axis 44A. Recess 47 may accommodate the main section 52 out of the fluid flow path, when the check valve 20 is in its open state enabling fluid to flow from the passageway 34 to the passageway 44.

Figure 5A:
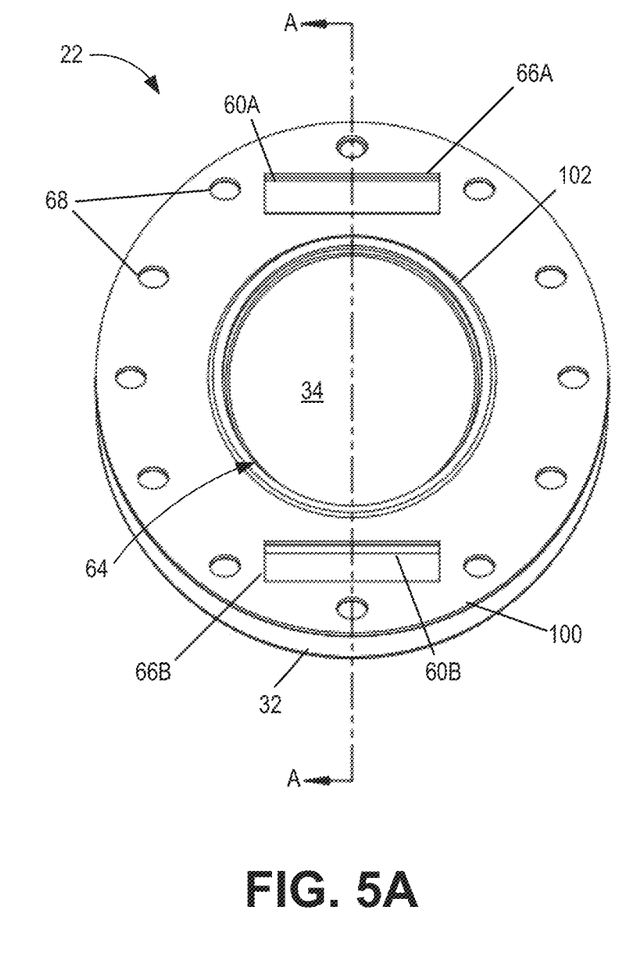
FIGS. 5A and 5B are front and side cross-section views of the valve body section of FIG. 4A.
Figure 6A:
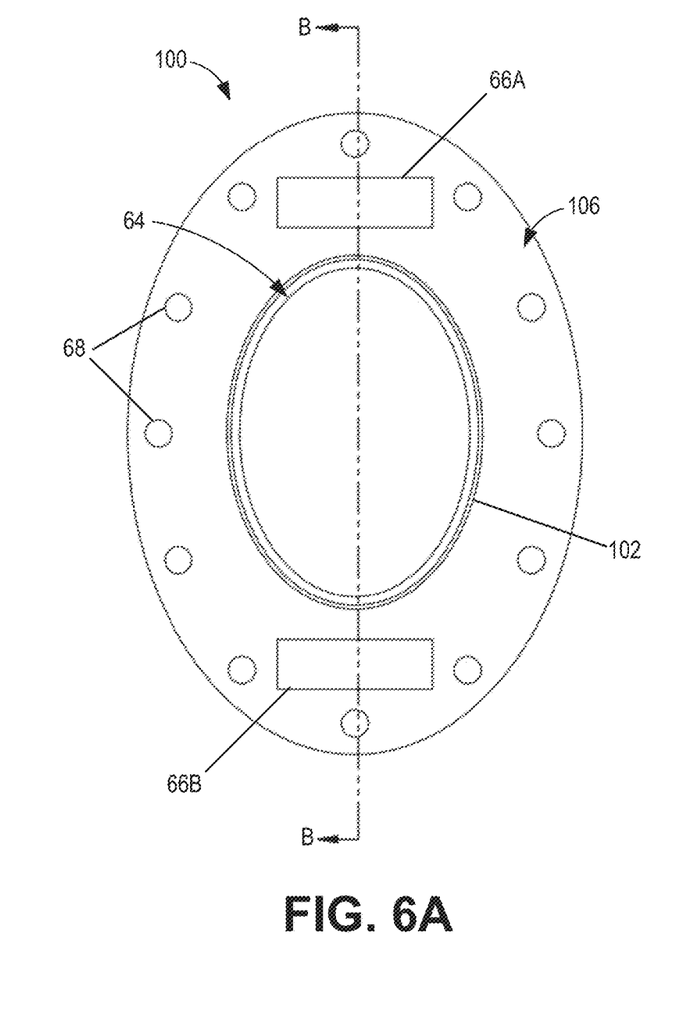
FIGS. 6A and 6B are front and side cross-section views of a face gasket, according to an implementation.

In either the straight configuration (e.g., FIG. 2B) or the elbow configuration (e.g., FIG. 3B), face gasket 100 may have the dual function of sealing the interface between valve body sections 22/24 and providing a valve seat for flapper valve member 26. As best seen in FIGS. 5A and 6A, face gasket 100 may be of a generally elliptical shape corresponding to the elliptical shape of flange 32 of valve body section 22 (and corresponding flange 42 of valve body section 24). Face gasket 100 is configured to substantially match the planar angled inner surface 36 of flange 32. For example, face gasket 100 and flange 32 may have geometrically similar perimeters. A portion of face gasket 100 that surrounds the outlet port of central passageway 34 forms the valve seat for the flapper 26.

Face gasket 100 may include any suitable material (e.g., a compressible material, such a rubber) to prevent the leakage of any fluid between the inner surfaces of the flanges 32 and 42, respectively, when the valve body sections 22 and 24 are connected together in either the aligned or elbow configurations. According to an implementation, face gasket 100 may include a compressible material (FIG. 2C, also referred to as elastomer layer 106) applied over a support disk 104 (FIGS. 7A and 7B) of a rigid material (e.g., a metal, such as stainless steel). According to an implementation, support disk 104 may include a thin sheet (e.g., 1-2 millimeters thick) stamped to form an elliptical shape with an elliptical central window 64, cutouts 66, and apertures 68, as described further below. Support disk 104 may be overmolded with the elastomer layer 106. As shown, for example, in FIGS. 6A and 6B, a portion of elastomer layer 106 may include a raised portion, referred to as O-ring 102, described further below.

Figure 6B:
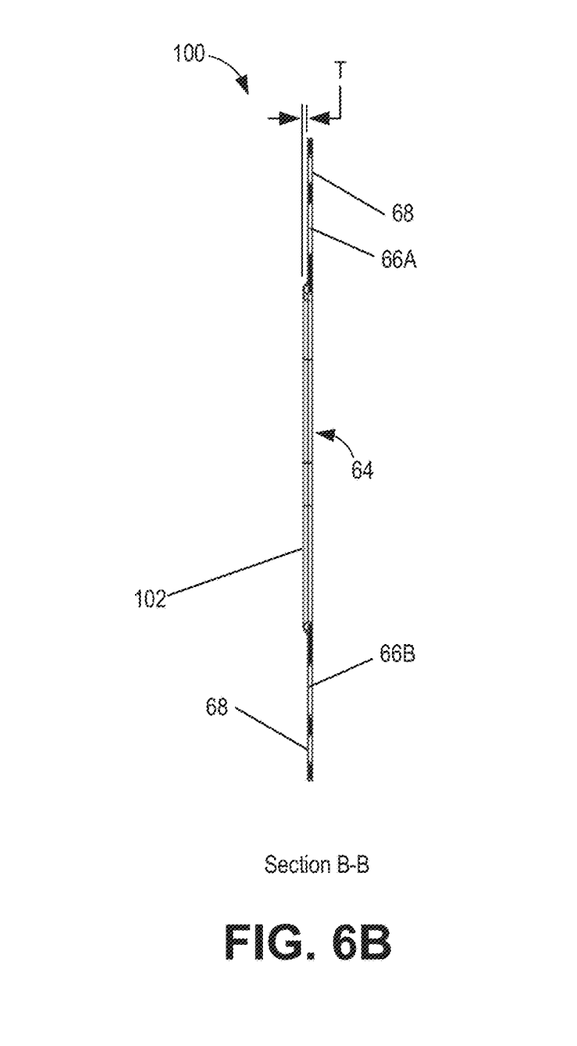
Figure 7A:
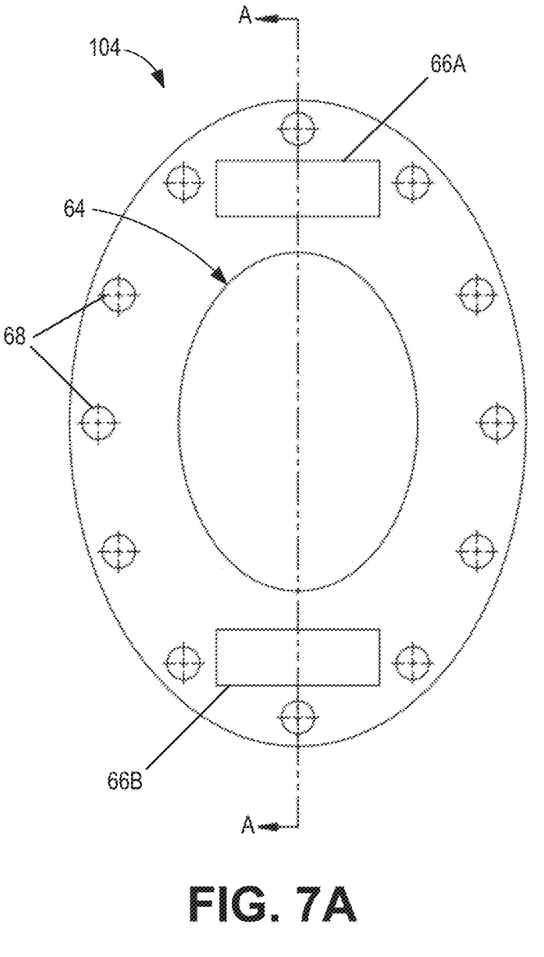
FIGS. 7A and 7B are front and side cross-section views of a support disk, according to an implementation.
Figure 7B:
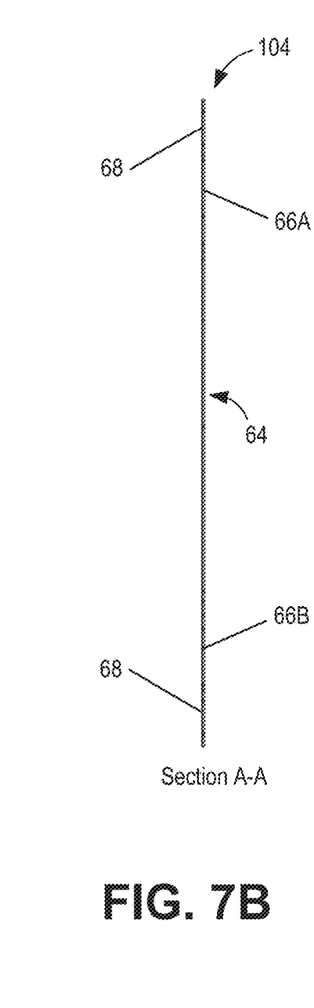

Face gasket 100 is shown in isolation in FIGS. 6A and 6B. Face gasket 100 may include the central window 64 of generally elliptical shape and whose size is substantially equal to that of the inlet flow port of valve body section 22. Face gasket 100 may include a valve seat with an integrated O-ring 102. O-ring 102 may include a raised compressible surface configured to engage the contact surface 58 (e.g., FIGS. 2C and 3C) of flapper valve member 26 when flapper valve member 26 is closed, such as when an overpressure situation exists in the passageway 44 (e.g., upon an attempted reverse flow) or when there is no fluid flowing through valve 20. In one implementation, integrated O-ring 102 may extend a thickness ("T" of FIG. 6B) at least 1 millimeter beyond the thickness of the primary plane of face gasket 100.

Face gasket 100 may include a pair of cutouts 66A and 66B, which are located diametrically opposed to each other along the longitudinal axis of, and outside of, the elliptical shaped central window 64 so that the cutout 66A leaves the recess 60A of the flange 32 uncovered and the cutout 66B leaves the recess 60B of the flange 32 uncovered (FIG. 5A). In another implementation, face gasket 100 may include a single cutout 66 (e.g., in the location of either cutout 66A or 66B) that may be selectively positioned over one or the other of recess 60A or 60B. Face gasket 100 may also include a plurality of equidistantly spaced apertures 68 located close to its periphery. The apertures 68 are arranged to be aligned with correspondingly equidistantly spaced holes 70 extending about the flange 32 of the body section 22 and also aligned with correspondingly equidistantly spaced internally threaded holes 72 (FIG. 4B) extending about the flange 42 of the body section 24.

The aligned holes 70, 72 and apertures 68 are arranged to receive respective threaded fasteners 74, e.g., hex head bolts or screws, to releasably secure the flanges 32 and 42 to each other irrespective of whether the valve body sections are in the aligned or elbow configurations. For example, when the valve body section 22 and 24 are in their straight configuration or state the mounting section 54 of the flapper valve member 26 is extended through cutout 66A in the gasket 62 and into the recess 60A, at the same time a portion of the mounting section 54 extends into the recess 47 of the valve body section 24. The threaded fasteners 74 can then be tightened to secure the two valve body sections together, thereby locking the mounting section 54 of the flapper valve member in that recess.

Figure 4A:
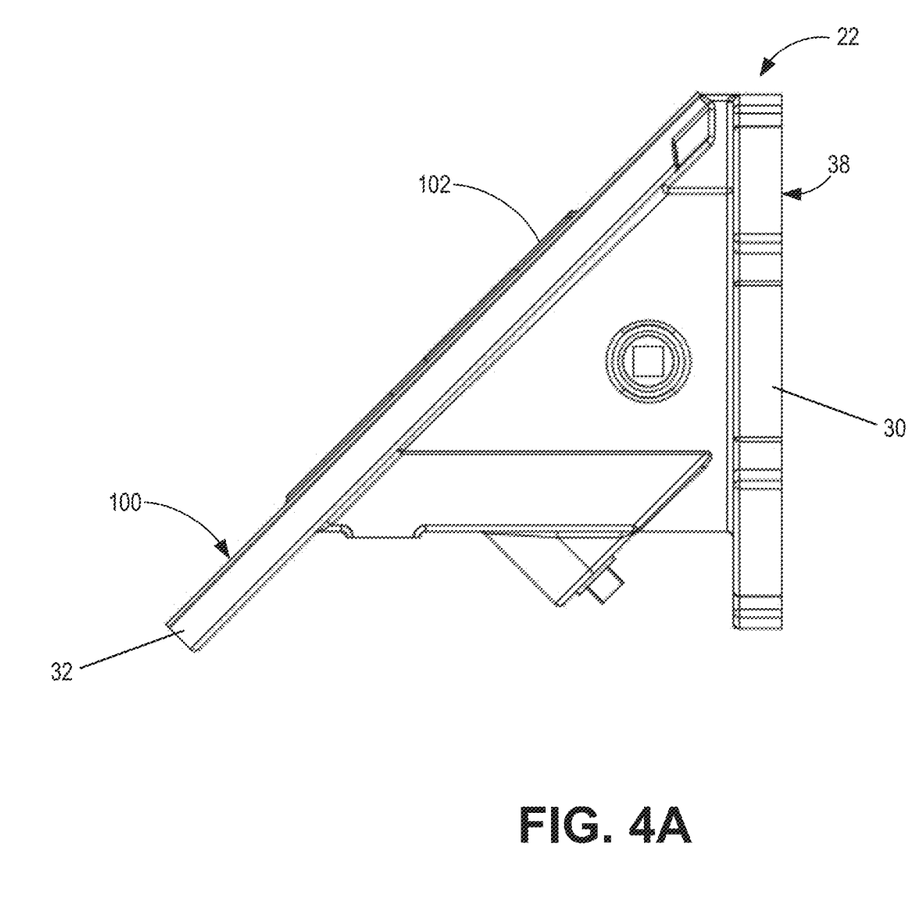
FIG. 4A is a side view of a valve body section with a face gasket applied on an inner end.
Figure 4B:
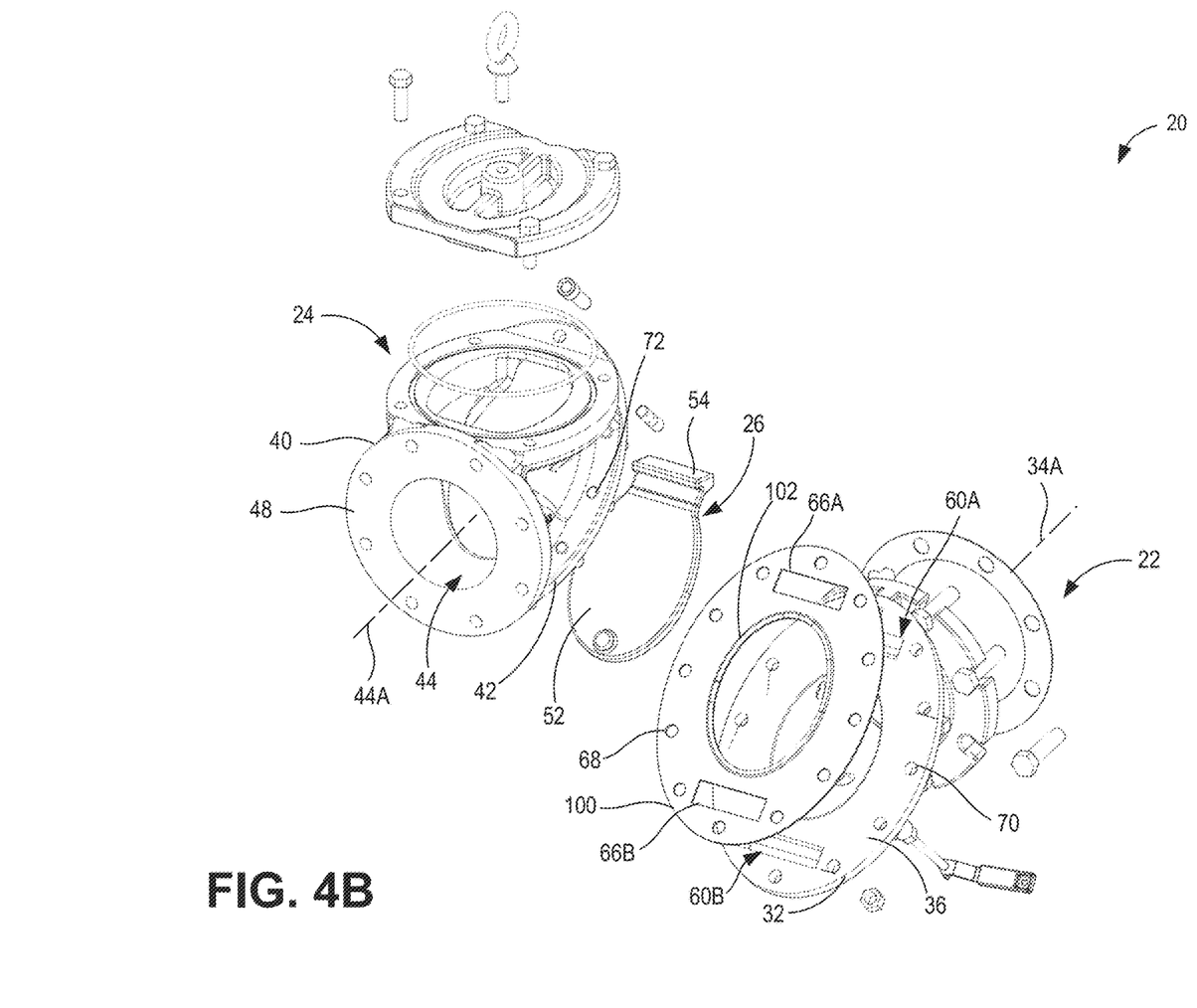
FIGS. 4B and 4C are exploded isometric views of the convertible check valve of FIG. 1 shown in a straight configuration.
Figure 4C:
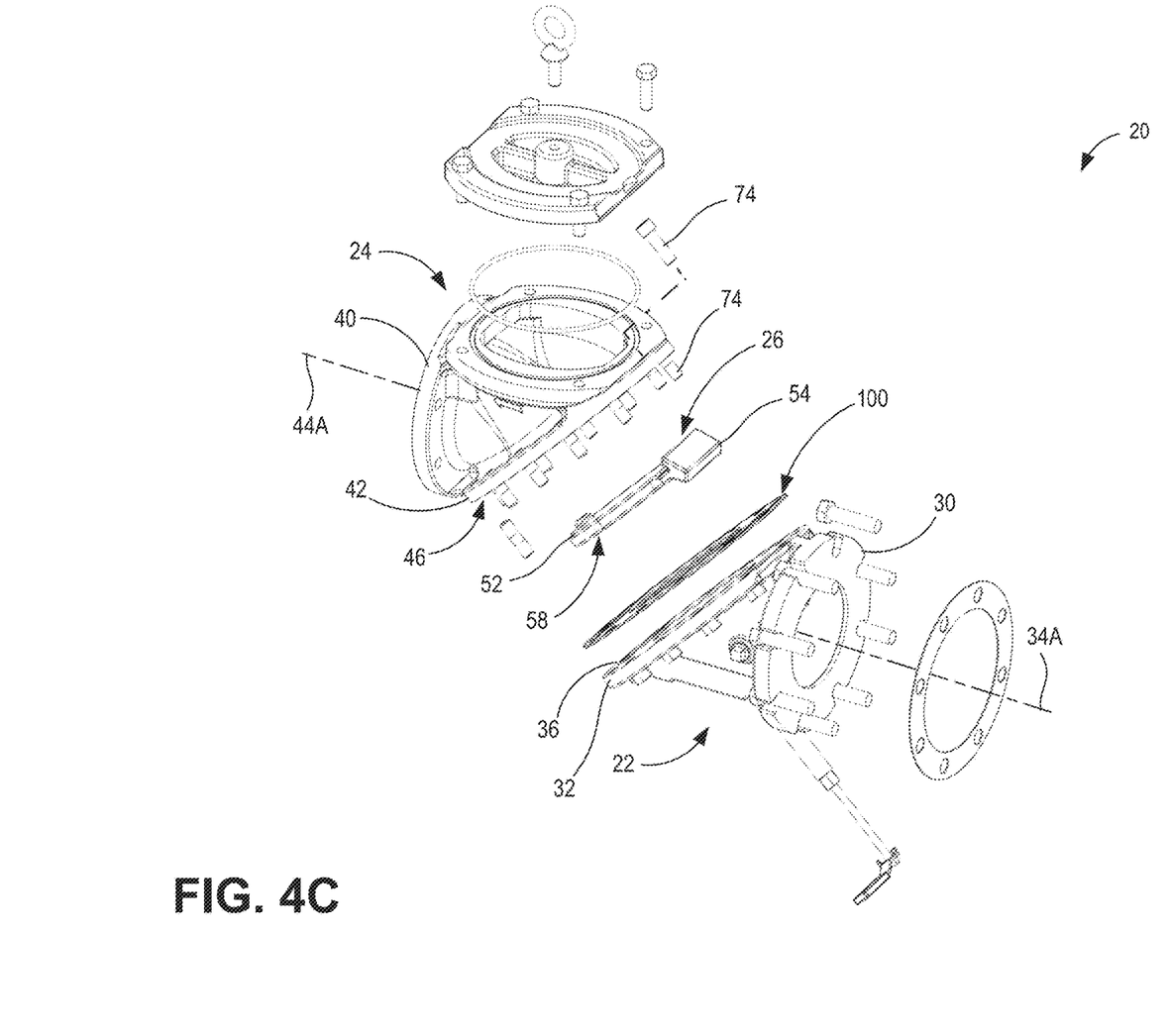
Figure 5B:
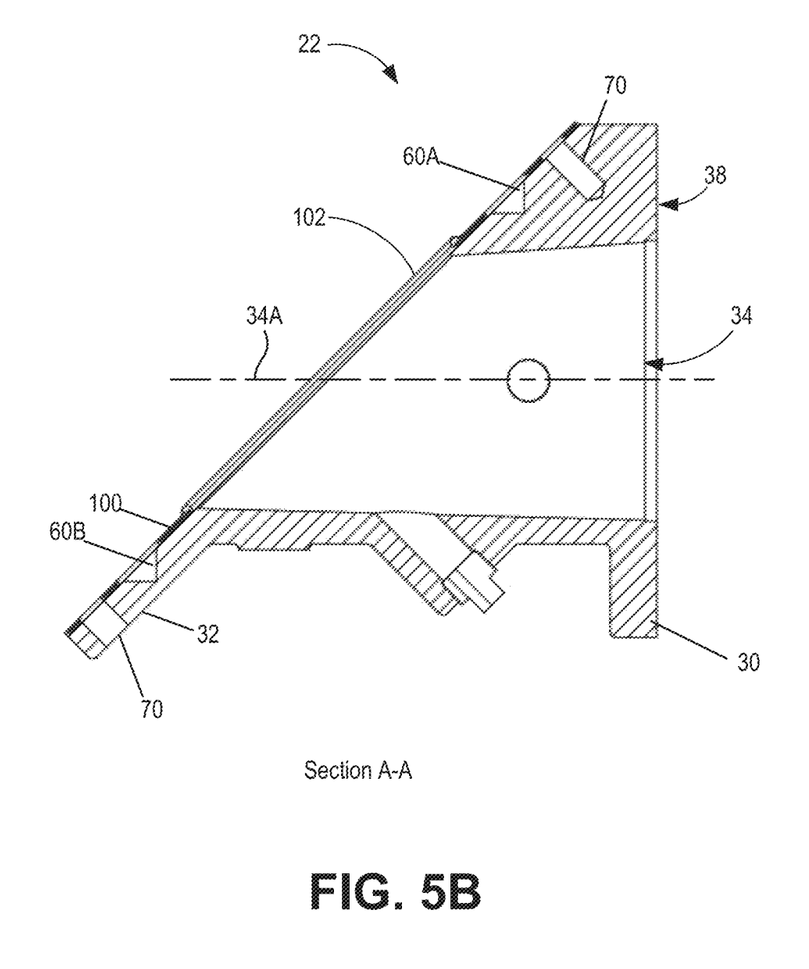

Face gasket 100 may be installed against flange 32 with the O-ring 102 facing outward (see, e.g., FIGS. 4A and 5A). When face gasket 100 is installed, as shown in FIG. 5B, O-ring 102 is positioned around the flow orifice and located outside the flow path of fluid exiting passageway 34. This location of O-ring 102 is advantageous for high flow versions of check valve 20, where the high flow of the fluid may otherwise cause shedding of flexible material (e.g. rubber) on face gasket 100.

The perimeter of the main section 52 of the flapper valve member 26 is slightly larger than the outlet port of central passageway 34 of the first body section 22. The contact surface 58 of flapper valve member 26 is arranged to be brought into sealing engagement with the O-ring 102 when an overpressure situation exists in the passageway 44 (e.g., upon an attempted reverse flow), as will be described later, or when there is no fluid flowing through the valve 20. Accordingly, if there is no liquid flowing through the valve, the contact surface 58 of the flapper valve member 26 will be in tight, sealing engagement with the O-ring 102 of face gasket 100 to isolate the passageways 34 and 44 from each other.

Operation of the check valve 20 in either the straight configuration or the elbow configuration is the same. In particular, so long as the fluid pressure within the inlet passageway 34 of the valve body section 22 is above the cracking or operating pressure of the valve 20, the main portion 52 of the flapper valve member 26 will be flexed or pivoted upward (i.e., into recess 47), so that its contact surface 58 will separated from O-ring 102 of face gasket 100, with the main portion 52 of the flapper valve member 26 contiguous with the mounting section 54 being disposed within the recess 47. Accordingly, the elliptical shaped flow port of the inlet valve body section 22 will be in full fluid communication with the elliptical flow port of the outlet valve body section 24, thereby enabling fluid to flow efficiently and unimpeded from the inlet passageway 34 to the outlet passageway 44 via the mating substantially identically sized and shaped elliptical flow ports. If, however, there should be some back pressure in the outlet passageway 44, which exceeds the predetermined operating pressure of the check valve 20, the flapper 26 will be flexed and pivoted downward toward the face gasket 100 by that over-pressure, whereupon the contact surface 58 of the flapper valve member 26 will move into fluid-tight engagement with O-ring 102 of the face gasket 100. This action thereby isolates the inlet passageway 34 from the outlet passageway 44 and thus prevents any back flow of liquid from the outlet passageway to the inlet passageway.

Figure 8:
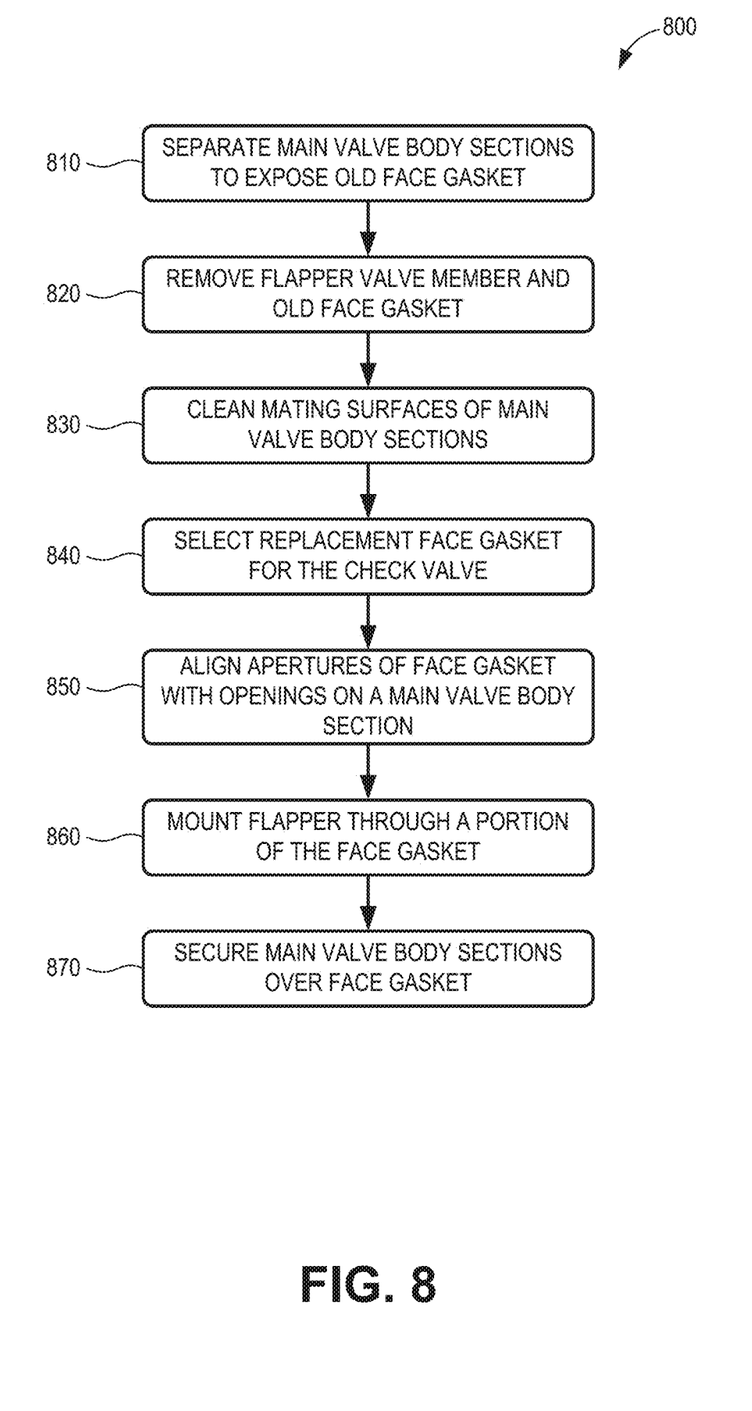
FIG. 8 is a flow diagram of a process for replacing a face gasket in a convertible check valve.

According to implementations described herein, face gasket 100 may be a replaceable component of convertible valve 20. FIG. 8 is a flow diagram for a process 800 for replacing a face gasket 100 of a check valve.

Process 800 may include separating the main valve body sections to expose the old face gasket (block 810). For example, to replace face gasket 100 and/or flapper valve member 26 from a valve 20 in either the straight configuration (FIGS. 2A/2B) or the elbow configuration (FIGS. 3A/3B), the threaded fasteners 74 may be disengaged to free the two valve body sections 22 and 24 from each other.

Process 800 may further include removing the flapper valve member and the old face gasket (block 820) and cleaning the mating surfaces of the main valve body sections (block 830). For example, once valve body sections 22 and 24 are separated, the flapper valve member 26 can be removed from notch 60A of flange 32 and cutout 66A of face gasket 100 (e.g., for the straight configuration) or from notch 60B and cutout 66B (e.g., for the axial configuration). The old face gasket 100 may then be removed from inner surface 36 of flange 32. Inner surface 36 of valve body section 22 and the inner surface of valve body section 24 may be scraped and cleaned.

Process 800 may also include selecting a replacement face gasket for the check valve (block 840) and aligning apertures of the face gasket with openings on one of the main valve body sections (block 850). For example, a technician may select a new face gasket 100 for the appropriate check valve 20 size. The new face gasket 100 may be applied over inner surface 36 (FIGS. 4B, 4C) such that apertures 68 align with holes 70. Similarly, cutouts 66A/B of the new face gasket 100 will align with notches 60A/60B.

Process 800 may additionally include mounting the flapper through a portion of the face gasket (block 860) and securing the main valve body sections over the face gasket (block 870). For example, a flapper valve member 26 (e.g., the existing flapper or a replacement flapper) may be installed on top of face gasket 100 so that the that the mounting section 54 of the flapper 26 is extended through cutout 66A or 66B in face gasket 100 and into the respective recess 60A or 60B. The threaded fasteners 74 can then be inserted through holes 70/apertures 68/holes 72 and tightened to secure valve sections 22 and 24 together with face gasket 100 therebetween. Accordingly, the contact surface 58 of the flapper 26 will be in tight, sealing engagement with the O-ring 102 of face gasket 100 to isolate the passageways 34 and 44 from each other. The refurbished valve 20 may now be connected between a set of inlet and outlet pipes so that liquid can then flow through valve 20 from the inlet pipe to the outlet pipe.

Systems and methods described herein provide a replaceable seat for convertible check valve. According to one implementation, a convertible check valve includes a first valve body section having a first passageway and a first flange, and a second valve body section having a second passageway and a second flange. The second flange is configured for connection to the first flange. The check valve also includes a flapper that moves between a closed state and an opened state. The flapper prevents flow between the first passageway and the second passageway when the flapper is in the closed state. The check valve also includes a gasket interposed between the first flange and the second flange. The gasket includes an opening to permit fluid communication between the first passageway and the second passageway and a valve seat with an integrated O-ring that is configured to contact the flapper when the flapper is in the closed state.

According to another implementation, a face gasket for a convertible check valve is provided. The check valve includes a first valve body section having a first passageway extending therethrough and a first flange at one end thereof, a second valve body section having a second passageway extending therethrough and a second flange at one end thereof, with the second flange being configured to be connected to the first flange, and a flapper valve member configured to be moved between a closed state and an opened state. The face gasket may include a compressible material applied over a rigid disk, a valve seat with an integrated O-ring that is configured to contact the flapper valve member when the flapper valve member is in a closed state, and an opening to permit fluid communication between a first passageway of and the second passageway. The face gasket is configured to be interposed between the first flange and the second flange to prevent leakage at the interface between the first valve body section and the second valve body section.

Various modifications can be made to the convertible check valve 20, within the scope of this invention, to provide a replaceable face gasket with dual functionality for sealing an interface between valve body sections and providing a valve seat for flapper valve member. For example, while one embodiment shown and described makes use of a flexible flapper 26, that is not mandatory. Thus, this invention contemplates use of a flapper that is rigid, but is mounted in such a way, e.g., by means of a hinge, etc., so that the flapper can pivot about an axis between the closed state and the opened state, and vice versa.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such.

What is claimed is:

1. A convertible check valve comprising:
   a first valve body section having a first passageway extending therethrough, the first valve body section including a first flange at one end thereof;
   a second valve body section having a second passageway extending therethrough, the second body section including a second flange at one end thereof, the second flange being configured to be connected to the first flange;
   a flapper valve member configured to be moved between a closed state and an opened state, the flapper valve member being configured to prevent flow between the first passageway the second passageway when the flapper valve member is in the closed state; and
   a gasket interposed between the first flange and the second flange to seal an interface between the first flange and the second flange, wherein a portion of the gasket forms a valve seat for the flapper valve member, the gasket including:
   an opening to permit fluid communication between the first passageway and the second passageway, and
   an O-ring that is a monolithic part of the gasket, wherein the O-ring is configured to contact the flapper valve member when the flapper valve member is in the closed state.

2. The convertible check valve of claim 1, wherein an interface between the first passageway and the second passageway extends at an angle of 45 degrees to a central axis of the first passageway, and
   wherein the opening of the gasket includes an elliptically-shaped central opening.

3. The convertible check valve of claim 1, wherein the gasket is substantially flat and wherein the O-ring includes a raised compressible surface.

4. The convertible check valve of claim 1, wherein the gasket and the first flange include geometrically similar perimeters.

5. The convertible check valve of claim 1, wherein the gasket includes a compressible material applied over a rigid disk.

6. The convertible check valve of claim 5, wherein the compressible material includes rubber and where the rigid disk includes steel.

7. The convertible check valve of claim 1, wherein the flapper valve member includes a main section that engages the valve seat and a mounting section, and
   wherein the gasket includes at least one cutout, outside of the opening, through which the mounting section is inserted.

8. The convertible check valve of claim 7, wherein the first flange includes a pair of recesses located diametrically opposed to each other, with one of the pair of recesses being configured to receive the mounting section of the flapper valve member when the convertible check valve is in an straight configuration, and with the other of the pair of recesses being configured to receive the mounting section when the convertible check valve is in an angled configuration; and wherein the gasket includes two cutouts that align with the pair of recesses.

9. The convertible check valve of claim 1, wherein the O-ring extends at least 1 millimeter beyond the thickness of a plane of the gasket.

10. The convertible check valve of claim 1, wherein the flapper valve member includes a planar contact surface that contacts the O-ring on the gasket.

11. The convertible check valve of claim 1, wherein the O-ring, when installed between the first flange and the second flange, is located outside a flow path through the convertible check valve.

12. A method for replacing a valve seat for a convertible check valve having a face gasket and a flapper valve member, the method comprising:

separating a first valve body section and a second valve body section of the convertible check valve to expose the face gasket;

removing the flapper valve member and the face gasket;

selecting a replacement face gasket for the convertible check valve;

aligning apertures of the replacement face gasket with openings on one of the first valve body section;

mounting a replacement flapper valve member through a portion of the replacement face gasket into one of the openings; and securing the first valve body section and the second valve body section over the replacement face gasket such that the replacement face gasket is interposed between the first valve body section and the second valve body section to seal an interface between the first valve body section and the second valve body section, and a portion of the replacement face gasket forms the valve seat for the replacement flapper valve member, wherein the replacement face gasket comprises an O-ring that is a monolithic part of the replacement face gasket, and the O-ring is configured to contact the replacement flapper valve member when the replacement flapper valve member is in a closed state.

13. The method of claim 12, further comprising:

after removing the face gasket, cleaning mating surfaces of the first valve body section and the second valve body section.

14. The method of claim 12, wherein selecting the replacement face gasket includes:

selecting the replacement face gasket with a first perimeter and a central opening that are geometrically similar to a second perimeter and an exit port of a mating surface of the first valve body section.

15. The method of claim 12, wherein selecting the replacement face gasket includes:

selecting the replacement face gasket comprising a compressible material applied over a rigid material.

16. The method of claim 12, wherein securing the first valve body section and the second valve body section over the replacement face gasket includes:

aligning holes in the first valve body section, the face gasket, and the second valve body section; and inserting threaded fasteners through the holes to secure the first valve body section to the second valve body section with the face gasket therebetween.

17. A face gasket for a convertible check valve including a first valve body section having a first passageway extending therethrough and a first flange at one end thereof, a second valve body section having a second passageway extending therethrough and a second flange at one end thereof, with the second flange being configured to be connected to the first flange, and a flapper valve member configured to be moved between a closed state and an opened state, the face gasket comprising:

compressible material applied over a rigid disk;

an O-ring that is a monolithic part of the face gasket, wherein the O-ring is configured to contact the flapper valve member when the flapper valve member is in the closed state; and an opening to permit fluid communication between the first passageway and the second passageway, wherein the face gasket is configured to be interposed between the first flange and the second flange to seal an interface between the first flange and the second flange, wherein a portion of the face gasket forms a valve seat for the flapper valve member.

18. The face gasket of claim 17, wherein the face gasket is substantially flat, and wherein the O-ring includes a raised compressible surface.

19. The face gasket of claim 17, wherein the compressible material includes rubber and where the rigid disk includes steel.

20. The face gasket of claim 17, wherein the face gasket includes a first perimeter and a central opening that are geometrically similar to a second perimeter and an exit port of a mating surface of the first valve body section.

* * * * *